(12) United States Patent
Jain (10) Patent No.: US 12,518,815 B2
(45) Date of Patent: Jan. 6, 2026

(54) SYSTEMS AND METHODS FOR A POWER WAKE-UP SEQUENCE IN A MEMORY DEVICE

(71) Applicant: Taiwan Semiconductor Manufacturing Company, Ltd., Hsinchu (TW)

(72) Inventor: Sanjeev Kumar Jain, Ottawa (CA)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 226 days.

(21) Appl. No.: 18/326,057

(22) Filed: May 31, 2023

(65) Prior Publication Data

US 2024/0404577 A1    Dec. 5, 2024

(51) Int. Cl.
G11C 11/4074 (2006.01)
G11C 11/4093 (2006.01)
G11C 11/4094 (2006.01)

(52) U.S. Cl.
CPC ...... *G11C 11/4074* (2013.01); *G11C 11/4093* (2013.01); *G11C 11/4094* (2013.01)

(58) Field of Classification Search
CPC ............ G11C 11/4074; G11C 11/4093; G11C 11/4094; G11C 11/419
See application file for complete search history.

(56) References Cited

U.S. PATENT DOCUMENTS

| | | | |
|---|---|---|---|
| 6,891,767 B2 | 5/2005 | Chun et al. | |
| 8,223,570 B2 | 7/2012 | Kushida | |
| 9,177,621 B2 | 11/2015 | Yu et al. | |
| 11,309,000 B2* | 4/2022 | Jain | G11C 7/12 |
| 11,763,863 B2* | 9/2023 | Jain | G11C 11/418 365/203 |
| 12,165,739 B2* | 12/2024 | Jain | G11C 7/106 |

(Continued)

FOREIGN PATENT DOCUMENTS

| | | |
|---|---|---|
| TW | 525185 B | 3/2003 |
| TW | 202137206 A | 10/2021 |
| TW | I769037 B | 6/2022 |

OTHER PUBLICATIONS

Taiwan Office Action; Application No. 112128277; Dated Aug. 28, 2024.

*Primary Examiner* — Khamdan N. Alrobaie
(74) *Attorney, Agent, or Firm* — Jones Day (57) ABSTRACT

Systems and methods are provided for controlling a wake-up operation of a memory circuit. The memory circuit may include a first memory cell, a first buffer, first logic circuitry, and first switching circuitry. The first memory cell may be configured to pre-charge in response to receiving a primary sleep signal. The first buffer may be configured to receive the primary sleep signal, generate a delayed primary sleep signal, and provide the delayed primary sleep signal to a second memory cell. The first logic circuitry may be configured to generate a first bit line pre-charge signal for the first memory cell of the plurality of memory cells in response to a looped sleep signal, wherein the looped sleep signal is generated based on the delayed primary sleep signal. The first switching circuitry may be configured to provide power to one or more bit line of the first memory cell in response to the first bit line pre-charge signal.

20 Claims, 9 Drawing Sheets

(56) References Cited

U.S. PATENT DOCUMENTS

| | | | |
|---|---|---|---|
| 2001/0028591 A1 | 10/2001 | Yamauchi | |
| 2006/0164904 A1* | 7/2006 | Saleh | G11C 16/24 |
| | | | 365/226 |
| 2022/0068327 A1* | 3/2022 | Jain | G11C 7/12 |
| 2022/0068330 A1* | 3/2022 | Jain | G11C 7/20 |
| 2022/0238144 A1* | 7/2022 | Jain | G11C 11/419 |

* cited by examiner

SYSTEMS AND METHODS FOR A POWER WAKE-UP SEQUENCE IN A MEMORY DEVICE

TECHNICAL FIELD

The technology described in this patent document relates generally to semiconductor memory systems, and more particularly to power management systems and methods for a semiconductor memory system.

BACKGROUND

Memory devices may be configured to operate in multiple states. For example, for power conservation purposes, a memory device may be configured to operate in an active state and lower power states, such as a shut-down, deep sleep, and light sleep. Circuitry may be used in a memory device to facilitate transitions among the available states.

BRIEF DESCRIPTION OF THE DRAWINGS

Aspects of the present disclosure are best understood from the following detailed description when read with the accompanying figures.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As noted above, a memory device may be configured to operate in multiple different power states. Power gates may be used to turn off periphery and memory array in a low power memory device (e.g. SRAM). When memory comes out of a sleep mode (e.g., shut-down, deep sleep, and light sleep), large power gates may be used to ramp up the internal supply voltage of the memory. In a design, providing a short wake-up time for the internal supply voltage may lead to large in-rush current. There may be a design trade-off between in-rush current (e.g., wake-up peak current) and the memory wake-up time.

Power states of a memory may be structured in a variety of ways. In one example, the word line internal supply and bit line pre-charge circuit of a memory system may be turned off during light sleep mode. Memory design criteria may require maintaining a wake-up peak current that is smaller than the mission mode (R/W operation) peak current, particularly during light sleep mode. Some memory systems may fail to meet this criteria during light sleep wake-up because array power wake-up occurs at almost the same time as the bit lines are pre-charged within a memory bank.

Systems and methods for power management in a memory system are described herein. In embodiments, a second sleep loop is added to a semiconductor memory system (e.g., SRAM) to achieve a sequential memory array supply pre-charge operation and a separate, sequential bit line pre-charge operation when coming out of power management mode (e.g., shut-down, deep sleep, and light sleep). In this manner, by separating the memory array power up and the bit line pre charge operations, the wake-up peak current within a memory bank may be reduced in comparison to existing SRAM architectures. In some embodiments, the change in the required current based on this design change may be as high as a 42% reduction.

Memory devices may be implemented by activating/transmitting commands (e.g., word line activation commands, column read commands, word line/bit line pre-charge commands, sense amplifier pre-charge commands, sense amplifier enable commands, read driver commands, write driver commands) to memory banks, which are often implemented via multiple memory arrays (e.g., a left array and a right array of a memory bank, four memory arrays of a memory bank). Each memory array contains a plurality of memory cells, typically arranged in rows and columns.

Figure 1:
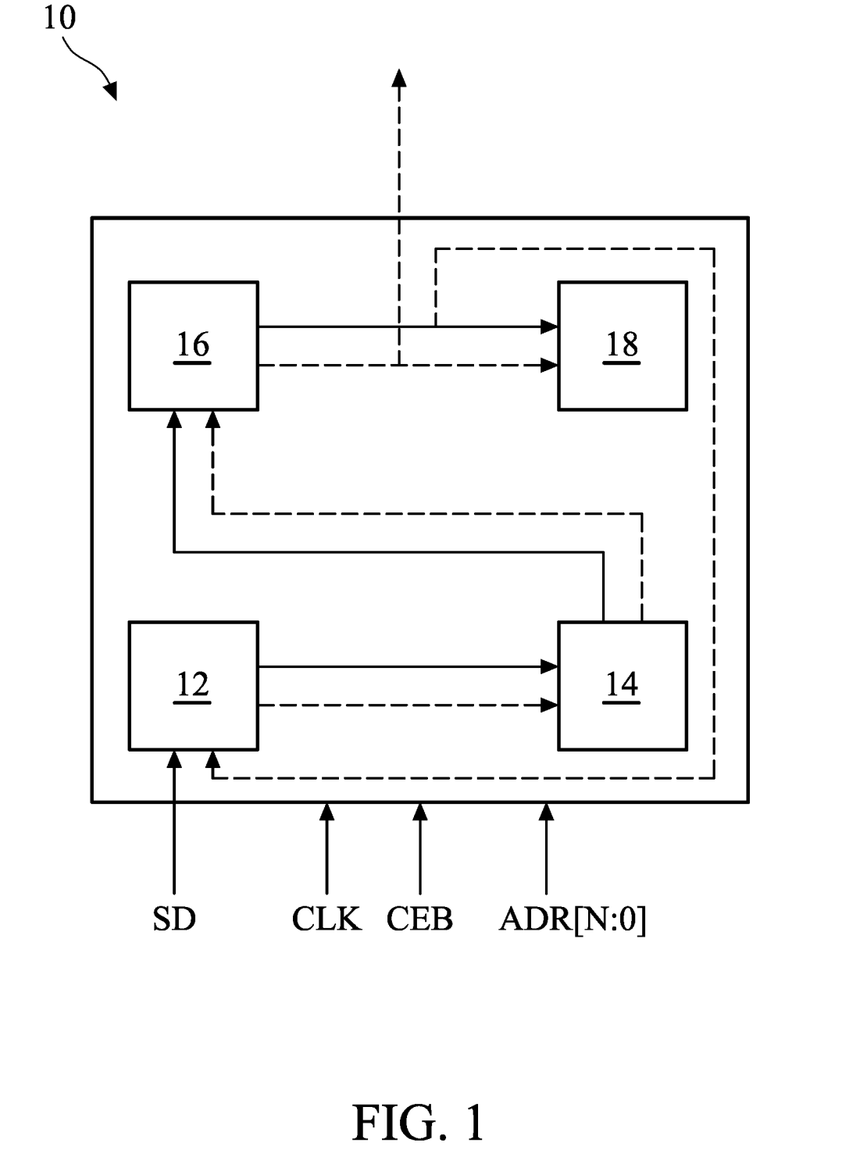
FIG. 1 is a diagram of an example sleep loop architecture within a power management circuit for a semiconductor memory (e.g., SRAM), in accordance with various embodiments of the present disclosure.

FIG. 1 is a diagram of an example power management circuit 10 for a semiconductor memory (e.g., SRAM) operating with a sleep loop, in accordance with an embodiment. The power management circuit 10 may be formed of numerous electrical components, including the depicted memory cells 12, 14, 16, 18 configured to store information in the form of '0' or '1', among many other components such as those described in more detail in FIG. 2. The process of storing information to the memory cells 12, 14, 16, 18 is known as "writing." The process of reading information stored on the memory cells 12, 14, 16, 18 is known as "reading." Reading and writing are example functions of the memory device. In order to perform these functions, some electrical components that make up the memory device require power and need to be turned on. However, not all electrical components require power during these functions and can be turned off temporarily (e.g., placed into a sleep mode). The process of turning on or off certain electrical components within the memory device is known as power management. Power management in the power management circuit 10 occurs using a series of power management signals sent to the electrical components to tell them whether to turn on or off. When electrical components undergoing a wake-up process have overlapping timeframes, this can lead to large wake-up peak current requirements.

As shown in the example of FIG. 1, the power management circuit 10 can be configured to receive numerous inputs, including a clock input (CLK), a chip enable input (CEB), an address input (ADR[N:0]]), and a sleep input signal. The sleep signal includes a primary sleep signal pathway (solid lines) for pre-charging the memory cells in sequential order, proceeding from the bottom left memory cell 12 to the top right memory cell 18. Additionally, a looped sleep signal pathway (dotted lines) may be used to pre-charge the bit line of each memory cell in sequential order following pre-charging of each memory cell via the primary sleep pathway. By utilizing this looped second sleep signal pathway, the wake-up peak current within a memory bank may be reduced, because the various bit line pre-charge and memory array supply pre-charge operations are not occurring over substantially overlapping timeframes.

Figure 2:
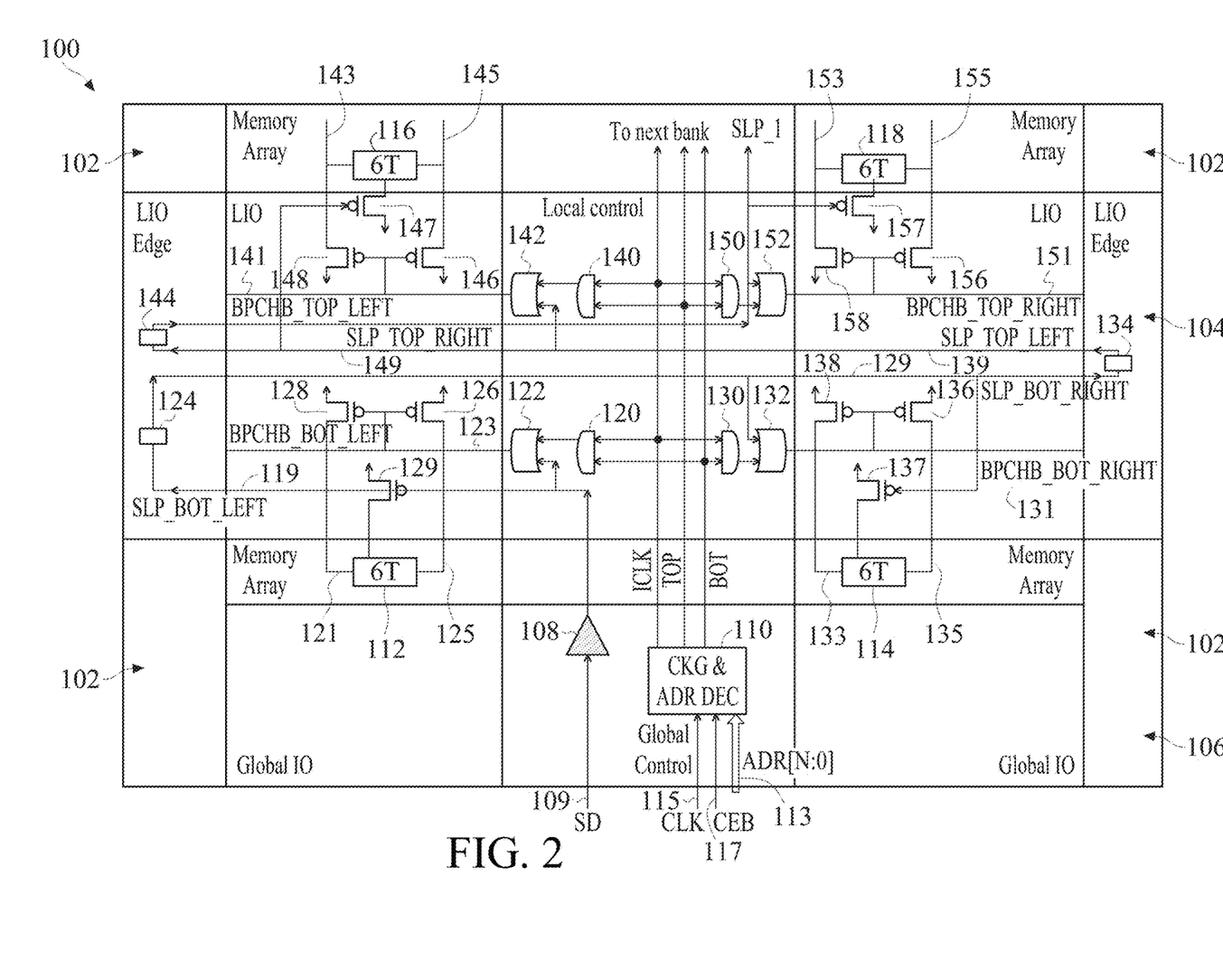
FIG. 2 is a diagram of an example power management circuit for a semiconductor memory (e.g., SRAM), in accordance with various embodiments of the present disclosure.

FIG. 2 is a diagram of an example power management circuit 100 for a semiconductor memory (e.g., SRAM) operating without a sleep loop, in accordance with an embodiment. The example power management circuit 100 includes a memory array 102 having a plurality of memory cells that are controlled by a local input/output (I/O) system 104 and a global I/O system 106. The global I/O system 106 includes logic circuitry 108 that generates a sleep signal 119 from an input sleep signal 109 (SD), and a clock generator and address decoder 110 that generates clock (ICLK) and addressing signals (TOP, BOT) for selecting a memory cell in the memory array 102 for read or write operations. The clock generator and address decoder 110 generates the clock signal (ICLK) as function of a global clock signal 115 (CLK) and a chip enable signal 117 (CEB), and generates address signals (TOP, BOT) as function of an address word 113 (ADR[N:0]) and the chip enable signal 117 (CEB).

The local I/O system 104 includes logic circuitry for each of the memory cells in the memory array 102 that generate bit line pre-charge (BPCHB) signals for controlling power to the bit lines of the respective memory cells as a function of the sleep signal (SLP) and clock (ICLK) and address (TOP, BOT) signals. The local I/O system 104 further includes a plurality of buffers that causes the plurality of memory cells in the memory array 102 to receive power in a sequential manner.

In FIG. 2, the memory array 102 includes a first (bottom-left) memory cell 112, a second (bottom-right) memory cell 114, a third (top-left) memory cell 116, and a fourth (top-right) memory cell 118. As shown, the sleep signal (SLP) from the global I/O system 106 is received in the local I/O system 104 as a sleep signal 119 (SLP_BOT_LEFT) for the bottom-left memory cell 112.

The sleep signal 119 is input into the memory cell 112 in order to pre-charge the array supply of memory. Specifically, an array power wakeup signal 127 (VDDAI_BOT_LEFT) is used to pre-charge the memory array. After initiation of the array power wakeup in the memory cell 112, the sleep signal 119 (SLP_BOT_LEFT) is also input to the logic circuitry 120, 122 for the bottom-left memory cell 112, along with clock (ICLK) and addressing (TOP, BOT) signals. More particularly, the logic circuit for the bottom-left memory cell 112 includes a first logic (AND) gate 120 with inputs that receive the addressing (TOP, BOT) signals, and a second logic (OR) gate 122 with inputs that receive the output of the first logic gate 120 and the sleep signal 119 (SLP_BOT_LEFT). The output of the second logic (OR) gate 122 provides the bit line pre-charge signal 123 (BPCHB_BOT_LEFT) for switching circuitry in the bottom-left memory cell 112. Specifically, the bit line pre-charge signal 123 (BPCHB_BOT_LEFT) is received at the gate terminals of a pair of PMOS transistors 126, 128, which include source terminals that are coupled to a supply voltage, and drain terminals that are respectively coupled to the bit line 121 (BL_BOT_LEFT) and bit line bar 125 (BLB_BOT_LEFT) inputs of the bottom-left memory cell 112.

In response to a transition of the sleep signal 119 (SLP_BOT_LEFT) indicating a memory wake-up operation, the logic circuit 120, 122 for the bottom-left memory cell 112 generates a logic state on the bit line pre-charge signal 123 (BPCHB_BOT_LEFT) that causes power to be supplied to pre-charge the memory cell bit lines 121, 125 (BL_BOT_LEFT and BLB_BOT_LEFT). More specifically, the PMOS transistors 126, 128 are controlled by the bit line pre-charge signal 123 (BPCHB_BOT_LEFT) to provide power to the memory cell 112 bit lines 121, 125 (BL_BOT_LEFT and BLB_BOT_LEFT) in order to initialize the bit line voltages as the memory array 102 is powered on in response to the memory wake-up operation (VDDAI_BOT_LEFT). An example of this operation is illustrated in the timing diagram 200 shown in FIG. 3.

Figure 3:
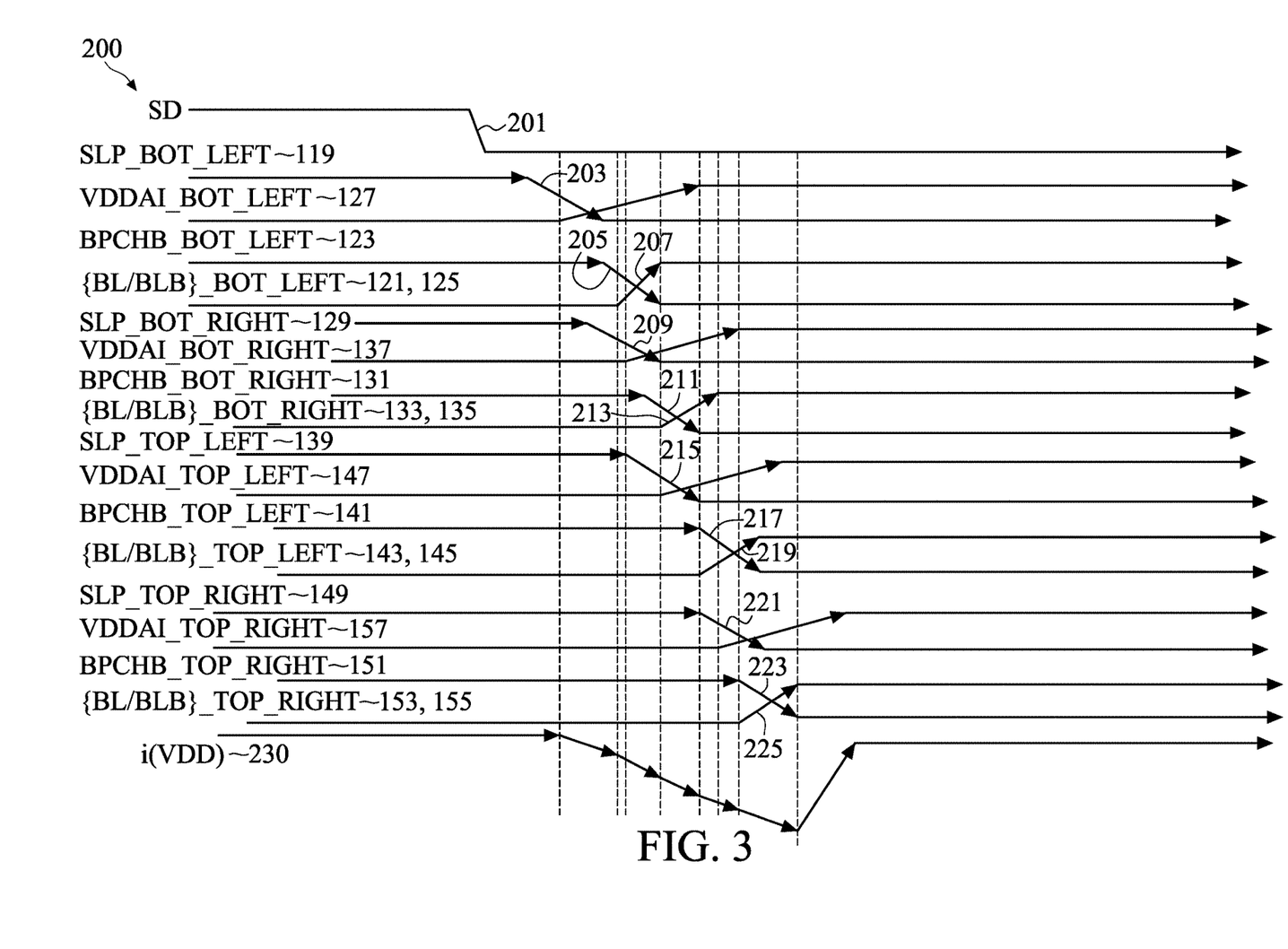
FIG. 3 is a timing diagram showing an example operation of the power management circuit of FIG. 2, in accordance with various embodiments of the present disclosure.

With reference to FIG. 3, in accordance with an embodiment, the wake-up operation is initiated by a logic high to logic low transition 201 in the sleep signal 109 (SD) received by the global I/O system 106. The logic state transition 201 of the sleep signal 109 (SD) causes a corresponding logic state transition 203 in the sleep signal 119 (SLP_BOT_LEFT) received by the local I/O system 104. As detailed above with reference to FIG. 2, the logic state transition 203 in the sleep signal 119 (SLP_BOT_LEFT) causes both the pre-charging of the memory cell 112 and the logic circuit 120, 122 for the bottom-left memory cell 112 to transition 205 the logic state of the bit line pre-charge signal 123 (BPCHB_BOT_LEFT), which causes power to be supplied to pre-charge memory cell bit lines 121, 125 (BL_BOT_LEFT and BLB_BOT_LEFT). The pre-charging of memory cell bit lines 121, 125 (BL_BOT_LEFT and BLB BOT LEFT) can be seen in the timing diagram 200 of FIG. 3 by the voltage transition 207 that occurs in response to the logic state transition 205 of the bit line pre-charge signal 123 (BPCHB_BOT_LEFT).

With reference again to FIG. 2, the sleep signal 119 (SLP_BOT_LEFT) is also received as an input to a first buffer 124. The buffer 124 generates a first delayed sleep signal 129 (SLP_BOT_RIGHT) in response to the sleep signal 119 (SLP_BOT_LEFT). As shown in the timing diagram 200 of FIG. 3, the first delayed sleep signal 129 (SLP_BOT_RIGHT) begins a logic state transition 209 after the bit line pre-charge signal 123 (BPCHB_BOT_LEFT) has begun its transition from logic high to logic low. As a result, the buffer can produce a time-delay between pre-charging of the bit line 121, 125 (BL_BOT_LEFT and BLB_BOT_LEFT) voltages of the bottom-left memory cell 112 and the initiation of wake-up operations for the bottom-right memory cell 114.

With reference again to FIG. 2, the first delayed sleep signal 129 is input into the memory cell 114 in order to pre-charge the array supply of memory. Specifically, an array power wakeup signal 137 (VDDAI_BOT_RIGHT) is used to pre-charge the memory cell 114. After initiation of the array power wakeup in the memory cell 114, the first delayed sleep signal 129 (SLP_BOT_RIGHT) is also provided as a sleep signal input to a logic circuit 130, 132 for the bottom-right memory cell 114 and also as an input to a second buffer 134. The logic circuit for the bottom-right memory cell 114 includes a first logic (AND) gate 130 with inputs that receive the addressing (TOP, BOT) signals, and a second logic (OR) gate 132 with inputs that receive the output of the first logic gate 130 and the first delayed sleep signal 129 (SLP_BOT_RIGHT). The output of the second logic (OR) gate 132 provides the bit line pre-charge signal 131 (BPCHB_BOT_RIGHT) for switching circuitry in the bottom-right memory cell 114. Specifically, the bit line pre-charge signal 131 (BPCHB_BOT_RIGHT) is received at the gate terminals of a pair of PMOS transistors 136, 138, which include source terminals that are coupled to a supply voltage, and drain terminals that are respectively coupled to the bit line 133 (BL_BOT_RIGHT) and bit line bar 135 (BLB_BOT_RIGHT) inputs of the bottom-right memory cell 114.

In response to a transition of the first delayed sleep signal 129 (SLP_BOT_RIGHT) indicating a memory wake-up operation, the logic circuit 130, 132 for the bottom-right memory cell 114 generates a logic state on the bit line pre-charge signal 131 (BPCHB_BOT_RIGHT) that causes the PMOS transistors 136, 138 to supply power to pre-charge the memory cell bit lines 133, 135 (BL_BOT_RIGHT and BLB_BOT_RIGHT). As shown in the timing diagram of FIG. 3, the logic state transition 209 in the first delayed sleep signal 129 (SLP_BOT_RIGHT) causes the logic circuit 130, 132 for the bottom-right memory cell 114 to transition 211 the logic state of the bit line pre-charge signal 131 (BPCHB_BOT_RIGHT), which causes power to be supplied to pre-charge memory cell bit lines 133, 135 (BL_BOT_RIGHT and BLB_BOT_RIGHT). The pre-charging of memory cell bit lines 133, 135 (BL_BOT_RIGHT and BLB_BOT_RIGHT) can be seen in the timing diagram 200 of FIG. 3 by the voltage transition 213 that occurs in response to the logic state transition 211 of the bit line pre-charge signal 131 (BPCHB_BOT_RIGHT).

With reference again to FIG. 2, the first delayed sleep signal 129 (SLP_BOT_RIGHT) is also received as an input to the second buffer 134, which generates a second delayed sleep signal 139 (SLP_TOP_LEFT). As shown in the timing diagram 200 of FIG. 3, the second delayed sleep signal 139 (SLP_TOP_LEFT) begins a high-to-low logic state transition 215 after the bit line pre-charge signal 131 (BPCHB_BOT_RIGHT) has begun its transition from logic high to logic low. As a result, the buffer can produce a time-delay between pre-charging of the bit line 133, 135 (BL_BOT_RIGHT and BLB_BOT_RIGHT) voltages of the bottom-right memory cell 114 and the initiation of wake-up operations for the top-left memory cell 116.

With reference again to FIG. 2, the second delayed sleep signal 139 is input into the memory cell 116 in order to pre-charge the array supply of memory. Specifically, an array power wakeup signal 147 (VDDAI_TOP_LEFT) is used to pre-charge the memory cell 116. After initiation of the array power wakeup in the memory cell 116, the second delayed sleep signal 139 (SLP_TOP_LEFT) is also provided as a sleep signal input to a logic circuit 140, 142 for the top-left memory cell 116 and also as an input to a third buffer 144. The logic circuit for the top-left memory cell 116 includes a first logic (AND) gate 140 with inputs that receive the addressing (TOP, BOT) signals, and a second logic (OR) gate 142 with inputs that receive the output of the first logic gate 140 and the second delayed sleep signal 139 (SLP_TOP_LEFT). The output of the second logic (OR) gate 142 provides the bit line pre-charge signal 141 (BPCHB_TOP_LEFT) for switching circuitry in the top-left memory cell 116. Specifically, the bit line pre-charge signal 141 (BPCHB_TOP_LEFT) is received at the gate terminals of a pair of PMOS transistors 146, 148, which include source terminals that are coupled to a supply voltage, and drain terminals that are respectively coupled to the bit line 143 (BL_TOP_LEFT) and bit line bar 145 (BLB_TOP_LEFT) inputs of the top-left memory cell 116.

In response to a transition of the second delayed sleep signal 139 (SLP_TOP_LEFT) indicating a memory wake-up operation, the logic circuit 140, 142 for the top-left memory cell 116 generates a logic state on the bit line pre-charge signal 141 (BPCHB_TOP_LEFT) that causes the PMOS transistors 146, 148 to supply power to pre-charge the memory cell bit lines 143, 145 (BL_TOP_LEFT and BLB_TOP_LEFT). As shown in the timing diagram of FIG. 3, the logic state transition 215 in the second delayed sleep signal 139 (SLP_TOP_LEFT) causes the logic circuit 140, 142 for the top-left memory cell 116 to transition 217 the logic state of the bit line pre-charge signal 141 (BPCHB_TOP_LEFT), which causes power to be supplied to pre-charge memory cell bit lines 143, 145 (BL_TOP_LEFT and BLB_TOP_LEFT). The pre-charging of memory cell bit lines 143, 145 BL_TOP_LEFT and BLB_TOP_LEFT) can be seen in the timing diagram 200 of FIG. 3 by the voltage transition 219 that occurs in response to the logic state transition 217 of the bit line pre-charge signal 141 (BPCHB_TOP_LEFT).

With reference again to FIG. 2, the second delayed sleep signal 139 (SLP_TOP_LEFT) is also received as an input to the third buffer 144, which generates a third delayed sleep signal 149 (SLP_TOP_RIGHT). As shown in the timing diagram 200 of FIG. 3, the third delayed sleep signal 149 (SLP_TOP_RIGHT) begins a high-to-low logic state transition 221 after the bit line pre-charge signal 141 (BPCHB_TOP_LEFT) has begun its transition from logic high to logic low. As a result, the buffer can produce a time-delay between pre-charging of the bit line 143, 145 (BL_TOP_LEFT and BLB_TOP_LEFT) voltages of the top-left memory cell 116 and the initiation of wake-up operations for the top-right memory cell 118.

With reference again to FIG. 2, the third delayed sleep signal 149 (SLP_TOP_RIGHT) is provided as a sleep signal input to a logic circuit 150, 152 for the top-right memory cell 118. The logic circuit for the top-right memory cell 118 includes a first logic (AND) gate 150 with inputs that receive the addressing (TOP, BOT) signals, and a second logic (OR) gate 152 with inputs that receive the output of the first logic gate 150 and the third delayed sleep signal 149 (SLP_TO- P_RIGHT). The output of the second logic (OR) gate 152 provides the bit line pre-charge signal 151 (BPCHB_TOP_RIGHT) for switching circuitry in the top-right memory cell 118. Specifically, the bit line pre-charge signal 151 (BPCHB_TOP_RIGHT) is received at the gate terminals of a pair of PMOS transistors 156, 158, which include source terminals that are coupled to a supply voltage, and drain terminals that are respectively coupled to the bit line 153 (BL_TOP_RIGHT) and bit line bar 155 (BLB_TOP_RIGHT) inputs of the top-right memory cell 118.

In response to a transition of the third delayed sleep signal 149 (SLP_TOP_RIGHT) indicating a memory wake-up operation, the logic circuit 150, 152 for the top-right memory cell 118 generates a logic state on the bit line pre-charge signal 151 (BPCHB_TOP_RIGHT) that causes the PMOS transistors 156, 158 to supply power to pre-charge the memory cell bit lines 153, 155 (BL_TOP_RIGHT and BLB_TOP_RIGHT). As shown in the timing diagram of FIG. 3, the logic state transition 221 in the third delayed sleep signal 149 (SLP_TOP_RIGHT) causes the logic circuit 150, 152 for the top-right memory cell 118 to transition 223 the logic state of the bit line pre-charge signal 151 (BPCHB_TOP_RIGHT), which causes power to be supplied to pre-charge memory cell bit lines 153, 155 (BL_TOP_RIGHT and BLB_TOP_RIGHT). The pre-charging of memory cell bit lines 153, 155 (BL_TOP_RIGHT and BLB_TOP_RIGHT) can be seen in the timing diagram 200 of FIG. 3 by the voltage transition 225 that occurs in response to the logic state transition 223 of the bit line pre-charge signal 151 (BPCHB_TOP_RIGHT).

In this manner, the bit lines of the four memory cells 112, 114, 116, 118 in the example embodiment power management circuit 100 are pre-charged, as illustrated in the example timing diagram 200 shown in FIG. 3. As further shown in FIG. 3, the near-simultaneous occurrence of the array power wakeup and the bit lines pre-charging causes a substantial peak in the resulting wake-up current draw 230. Sequential pre-charging of the bit lines can help alleviate the wakeup current draw and is described in U.S. Patent Application Publication 2022/0068327, filed on Jan. 4, 2021, which is incorporated by reference herein in its entirety. However, due to the overlap of array power wakeup and bit line pre-charging, staging the bit line pre-charging may be insufficient to reduce wakeup current draw 230 below desired levels.

Figure 4:
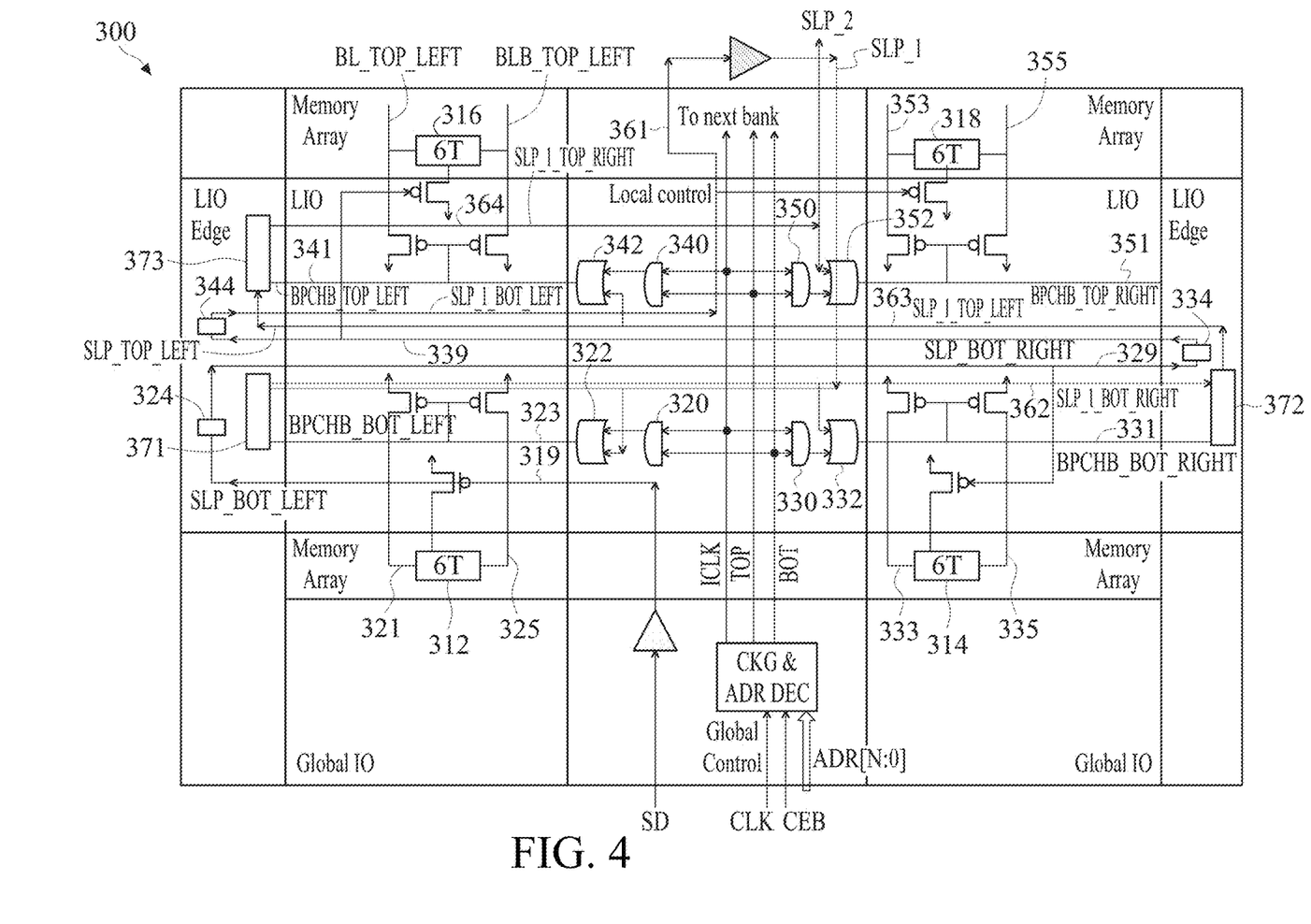
FIG. 4 is a diagram of another example power management circuit for a semiconductor memory (e.g., SRAM), in accordance with various embodiments of the present disclosure.

FIG. 4 is another example of a power management circuit 300 for a semiconductor memory (e.g., SRAM). Unlike the system provided in FIG. 2, the power management circuit 300 utilizes an improved sleep loop architecture that allows for the separation of the array power wakeup and the bit line pre-charging, while still employing the benefits of sequential wake-up and pre-charging. In other words, by separating the process of pre-charging the array supply of memory from the process of pre-charging the bit lines, thereby effectively creating eight unique, sequential current draws, the peak wakeup current draw may be further reduced. In order to achieve this separation, one or more sleep signal loops may be added to a power management circuit.

The example power management circuit 300 shown in FIG. 4 contains many of the same components as the example power management circuit 100 shown in FIG. 2, including a first (bottom-left) memory cell 312, a second (bottom-right) memory cell 314, a third (top-left) memory cell 316, and a fourth (top-right) memory cell 318, in accordance with an embodiment. However, unlike the example power management circuit 100 shown in FIG. 2, the example power management circuit 300 includes a primary sleep signal pathway (including SLP_BOT_LEFT, SLP_BOT_RIGHT, SLP_TOP_LEFT) configured to pre-charge the array supply of memory and a looped sleep signal pathway SLP_1 (including SLP_1_BOT_LEFT, SLP_1_BOT_RIGHT, SLP_1_TOP_LEFT, SLP_1_TOP_RIGHT) configured to sequentially pre-charge the bit lines.

In the illustrated embodiment, the primary sleep signal 319 is input into the memory cell 312 in order to pre-charge the array supply of memory. Specifically, the primary sleep signal 319 (SLP_BOT_LEFT) is used to pre-charge the memory cell 312. However, unlike in the example power management circuit 100 shown in FIG. 2, the sleep signal 319 (SLP_BOT_LEFT) is not also input to the logic circuitry 320, 322. Rather, the sleep signal 319 (SLP_BOT_LEFT) is received as an input to a first buffer 324, which generates a delayed primary sleep signal 329 (SLP_BOT_RIGHT) in response to the sleep signal 319 (SLP_BOT_LEFT). The delayed primary sleep signal 329 (SLP_BOT_RIGHT) is then provided to the second memory cell 314, which configured to pre-charge in response to receiving the delayed primary sleep signal 329 (SLP_BOT_RIGHT). A second buffer 334 receives the delayed primary sleep signal 329 (SLP_BOT_RIGHT), generates a second delayed primary sleep signal 339 (SLP_TOP_LEFT), and provides the second delayed primary sleep signal 339 (SLP_TOP_LEFT) to a third memory cell 316. The third memory cell 316 pre-charges in response to receiving the second delayed primary sleep signal 339 (SLP_TOP_LEFT). Subsequently, a third buffer 344 receives the second delayed primary sleep signal 339 (SLP_TOP_LEFT) and generates the looped sleep signal 361 (SLP_1_BOT_LEFT). The fourth memory cell 318 then pre-charges in response to receiving the looped sleep signal 361 (SLP_1_BOT_LEFT). As a result of this primary sleep pathway, all four memory cells may be sequentially pre-charged prior to bit line pre-charging occurring.

Figure 5:
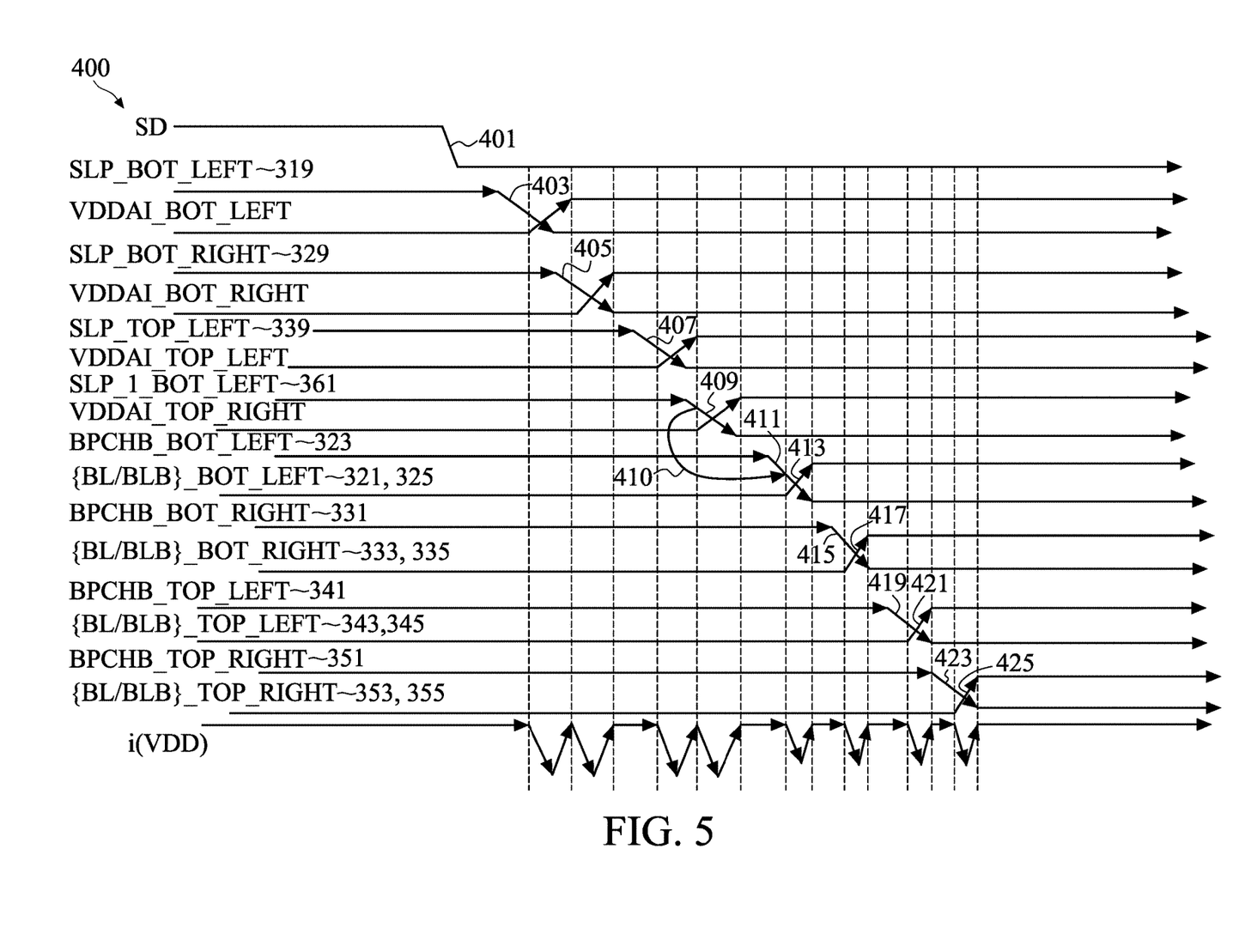
FIG. 5 is a timing diagram showing an example operation of the power management circuit of FIG. 4, in accordance with various embodiments of the present disclosure.

As shown in the timing diagram 400 of FIG. 5, in accordance with an embodiment, the memory cell wake-up operation is initiated by a logic high to logic low transition 401 in the primary sleep signal 319 (SLP_BOT_LEFT), thereby causing a logic state transition 403 in the primary sleep signal 319 (SLP_BOT_LEFT) which results in the pre-charging of the memory cell 312. Afterward, the sequential logic state transitions 405, 407, 409 in the delayed primary sleep signal 329 (SLP_BOT_RIGHT), second delayed primary sleep signal 339 (SLP_TOP_LEFT), and looped sleep signal 361 (SLP_1_BOT_LEFT) results in the pre-charging of the memory cells 314, 316, and 318, respectively.

With reference again to FIG. 4, after the looped sleep signal 361 (SLP_1_BOT_LEFT) is generated, it is provided to the first logic circuitry 320, 322 and also as an input into a first latch circuit 371. Similar to the example of FIG. 2, the logic circuit 320, 322 for the bottom-left memory cell 312 generates a logic state on a first bit line pre-charge signal 323 (BPCHB_BOT_LEFT) that causes power to be supplied to pre-charge the memory cell bit lines 321, 325 (BL_BOT_LEFT and BLB_BOT_LEFT). The first bit line pre-charge signal 323 (BPCHB_BOT_LEFT) is then input along with the looped sleep signal 361 (SLP_1_BOT_LEFT) into a first latch circuit 371, which generates a delayed looped sleep signal 362 (SLP_1_BOT_RIGHT).

The delayed looped sleep signal 362 (SLP_1_BOT_RIGHT) is then provided to the second logic circuitry 330, 332 and also as an input into a second latch circuit 372. Similar to the example of FIG. 2, the logic circuit 330, 332 for the bottom-right memory cell 314 generates a logic state on a second bit line pre-charge signal 331 (BPCHB_BOT_RIGHT) that causes power to be supplied to pre-charge the memory cell bit lines 333, 335 (BL_BOT_RIGHT and BLB_BOT_RIGHT). The second bit line pre-charge signal 331 (BPCHB_BOT_RIGHT) is then input along with the delayed looped sleep signal 362 (SLP_1_BOT_RIGHT) into a second latch circuit 372, which generates a second delayed looped sleep signal 363 (SLP_1_TOP_LEFT).

The second delayed looped sleep signal 363 (SLP_1_TOP_LEFT) is then provided to the third logic circuitry 340, 342 and also as an input into a third latch circuit 373. Similar to the example of FIG. 2, the logic circuit 340, 342 for the top-left memory cell 316 generates a logic state on a third bit line pre-charge signal 341 (BPCHB_TOP_LEFT) that causes power to be supplied to pre-charge the memory cell bit lines 343, 345 (BL_TOP_LEFT and BLB_TOP_LEFT). The third bit line pre-charge signal 341 (BPCHB_TOP_LEFT) is then input along with the second delayed looped sleep signal 363 (SLP_1_TOP_LEFT) into a third latch circuit 373, which generates a third delayed looped sleep signal 364 (SLP_1_TOP_RIGHT).

The third delayed looped sleep signal 364 (SLP_1_TOP_RIGHT) is then provided to the fourth logic circuitry 350, 352. As with the previous memory array circuits, the logic circuit 350, 352 for the top-right memory cell 318 generates a logic state on a fourth bit line pre-charge signal 351 (BPCHB_TOP_RIGHT) that causes power to be supplied to pre-charge the memory cell bit lines 353, 355 (BL_TOP_RIGHT and BLB_TOP_RIGHT). The third delayed looped sleep signal 364 (SLP_1_TOP_RIGHT) may then be supplied to the next memory bank SLP_2. Thus, as a result of this secondary sleep pathway, the bit lines of all four memory cells may be sequentially pre-charged.

With reference again to FIG. 5, the looped sleep signal 361 (SLP_1_BOT_LEFT) is looped back to the first memory cell 312, as shown by arrow 410, thereby causing the logic circuit 320, 322 for the bottom-left memory cell 312 to transition 411 the logic state of the bit line pre-charge signal 323 (BPCHB_BOT_LEFT), which causes power to be supplied to pre-charge memory cell bit lines 321, 325 (BL_BOT_LEFT and BLB_BOT_LEFT). The pre-charging of memory cell bit lines 321, 325 (BL_BOT_LEFT and BLB_BOT_LEFT) can be seen in the voltage transition 413 that occurs in response to the logic state transition 411 of the bit line pre-charge signal 323 (BPCHB_BOT_LEFT). Similarly, the delayed looped sleep signal 362 (SLP_1_BOT_RIGHT) next causes the logic circuit 330, 332 for the bottom-right memory cell 314 to transition 415 the logic state of the second bit line pre-charge signal 331 (BPCHB_BOT_RIGHT), which causes power to be supplied to pre-charge memory cell bit lines 333, 335 (BL_BOT_RIGHT and BLB_BOT_RIGHT), as can be seen in the voltage transition 417. Next, the second delayed looped sleep signal 363 (SLP_1_TOP_LEFT) next causes the logic circuit 340, 342 for the top-left memory cell 316 to transition 419 the logic state of the third bit line pre-charge signal 341 (BPCHB_TOP_LEFT), which causes power to be supplied to pre-charge memory cell bit lines 343, 345 (BL_TOP_LEFT and BLB_TOP_LEFT), as can be seen in the voltage transition 421. Finally, the third delayed looped sleep signal 364 (SLP_1_TOP_RIGHT) causes the logic circuit 350, 352 for the top-right memory cell 318 to transition 423 the logic state of the fourth bit line pre-charge signal 351 (BPCHB_TOP_RIGHT), which causes power to be supplied to pre-charge memory cell bit lines 353, 355 (BL_TOP_RIGHT and BLB_TOP_RIGHT), as can be seen in the voltage transition 425.

The buffers used to create the multiple delayed primary sleep signals and the looped sleep signal may be an even number of inverters in series. The number of inverters may be chosen based on system requirements. For instance, the number of inverters that form each buffer may be modified based on the desired delay times between the primary sleep signals (forming part of the wake-up memory time) in addition to the desired wakeup peak current. The first, second, and third buffers may be configured to delay the looped sleep signal from being provided to the first logic circuitry until after either the third memory cell and/or fourth memory cell has been completely pre-charged. As a result, the second and third buffers can form part of a delay circuit that receives the delayed primary sleep signal and generates the looped sleep signal, wherein the delay circuit is configured to delay the looped sleep signal from being provided to the first logic circuitry until after a specific memory cell has been completely pre-charged. In some aspects, either one or more of the buffers or one or more of the latch circuits may be excluded while retaining the sleep loop, thereby retaining the separation or partial separation of the bit line pre charging and the array power wakeup.

Although the looped sleep signal in FIG. 4 is generated in response to the second delayed primary sleep signal, it should be appreciated that other configurations that separate the memory array power wakeup and the bit line pre charge operations are possible. The system may have multiple looped sleep signals, allowing for consecutive wake up and bit line pre charging at each memory cell. For instance, a first looped sleep signal could be used to pre charge the bit line of the bottom-left and bottom-right memory cells after array power wakeup has occurred in these cells, but before array power wakeup has occurred in the top-left and top-right memory cells. After which, the top-left and top right memory cells can subsequently undergo a similar wakeup and bit line pre charge sequence with a second looped pathway. In this manner, the looped sleep signal may be generated based on the delayed primary sleep signal, such as being generated by the delayed primary sleep signal or a signal derived therefrom (e.g. a second delayed primary sleep signal). Likewise, although many of the embodiments described herein depict the pre-charge and power sequences progressing from the bottom left memory cell to the bottom right memory cell to the top left memory cell and then finally to the top right memory cell, it should be appreciated that these sequences can have alternative orderings (e.g., starting with the bottom right memory cell).

Figure 6:
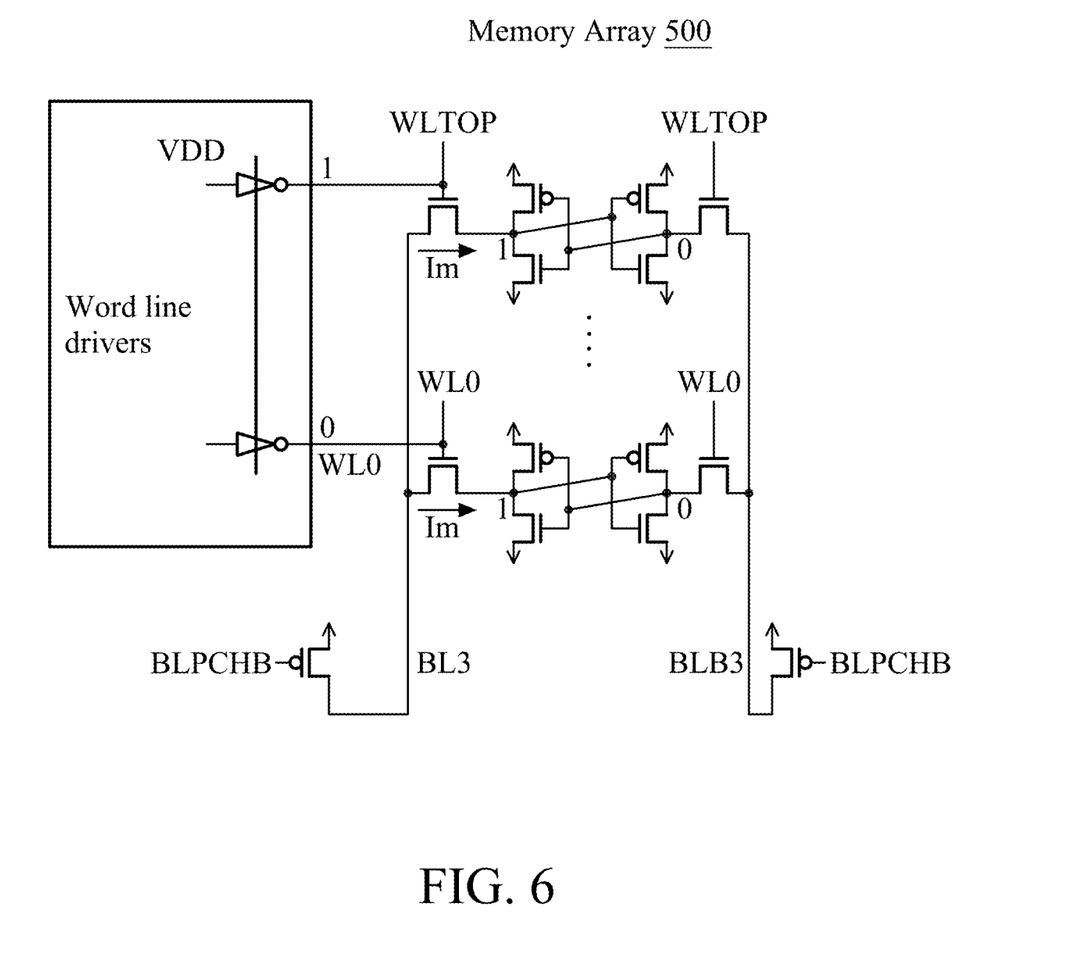
FIG. 6 is a diagram showing an example memory array that may, for example, be utilized in the power management circuit of FIGS. 1, 2, and 4, in accordance with various embodiments of the present disclosure.

FIG. 6 depicts an example memory array 500 with memory cells that can be incorporated into the power management circuits of the memory devices described herein, in accordance with an embodiment. The memory array may specifically comprise 6 T static random-access memory. The core of each of the cells depicted in the memory array 500 may be formed of two CMOS inverters. As previously discussed herein, the example memory array 500 may receive a bit line pre-charge signal at the gate terminals of a pair of PMOS transistors, which may include source terminals that are coupled to a supply voltage, and drain terminals that may be respectively coupled to the bit line and bit line bar inputs of each memory cell. As discussed, by separating the bit line pre-charge and memory array supply pre-charge operations provided to each memory cell, the wake-up peak current within a memory bank may be reduced.

Figure 7:
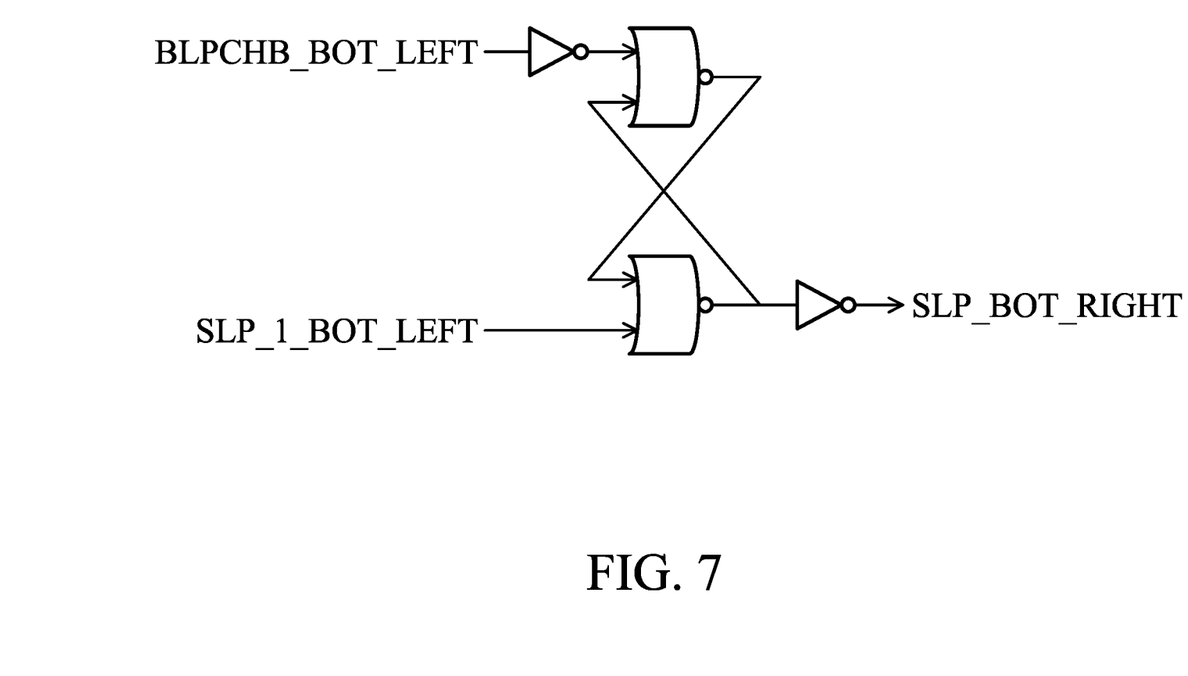
FIG. 7 depicts an example of an SR latch that may, for example, be utilized as one or more of the latch circuits in FIG. 4 in accordance with an embodiment.

FIG. 7 depicts an example of an SR latch that may, for example, be utilized as one or more of the latch circuits 371, 372, 373 in FIG. 4, in accordance with an embodiment. The SR latch may function to effectively delay each looped sleep signal that is provided to each respective memory cell. As shown, the example SR latch may include a pair of logic (NOR) gates and a pair of inverters. The logic (NOR) gates may be connected in a feedback configuration with the output of a first logic (NOR) gate coupled to an input of a second logic (NOR) gate, and the output of the second logic (NOR) gate coupled as an input to the first logic (NOR) gate. A first inverter may be coupled to a second input of the first logic gate, and a second inverter 308 is coupled to the output of the second logic (NOR) gate. A bit line pre-charge signal (e.g., BLPCHB_BOT_LEFT) may be coupled as the input to the first inverter, and a looped sleep signal (e.g., SLP_1_BOT_LEFT) may be coupled as the second input to the second logic (NOR) gate. The output of the second inverter may provide a delayed looped sleep signal (e.g., SLP_1_BOT_RIGHT). The delayed looped sleep signal may be time delayed relative to the looped sleep signal. The delayed looped sleep signal may be provided to the next memory cell where it may be used as an input into additional logic circuitry and also as an input into another latch circuit.

Figure 8:
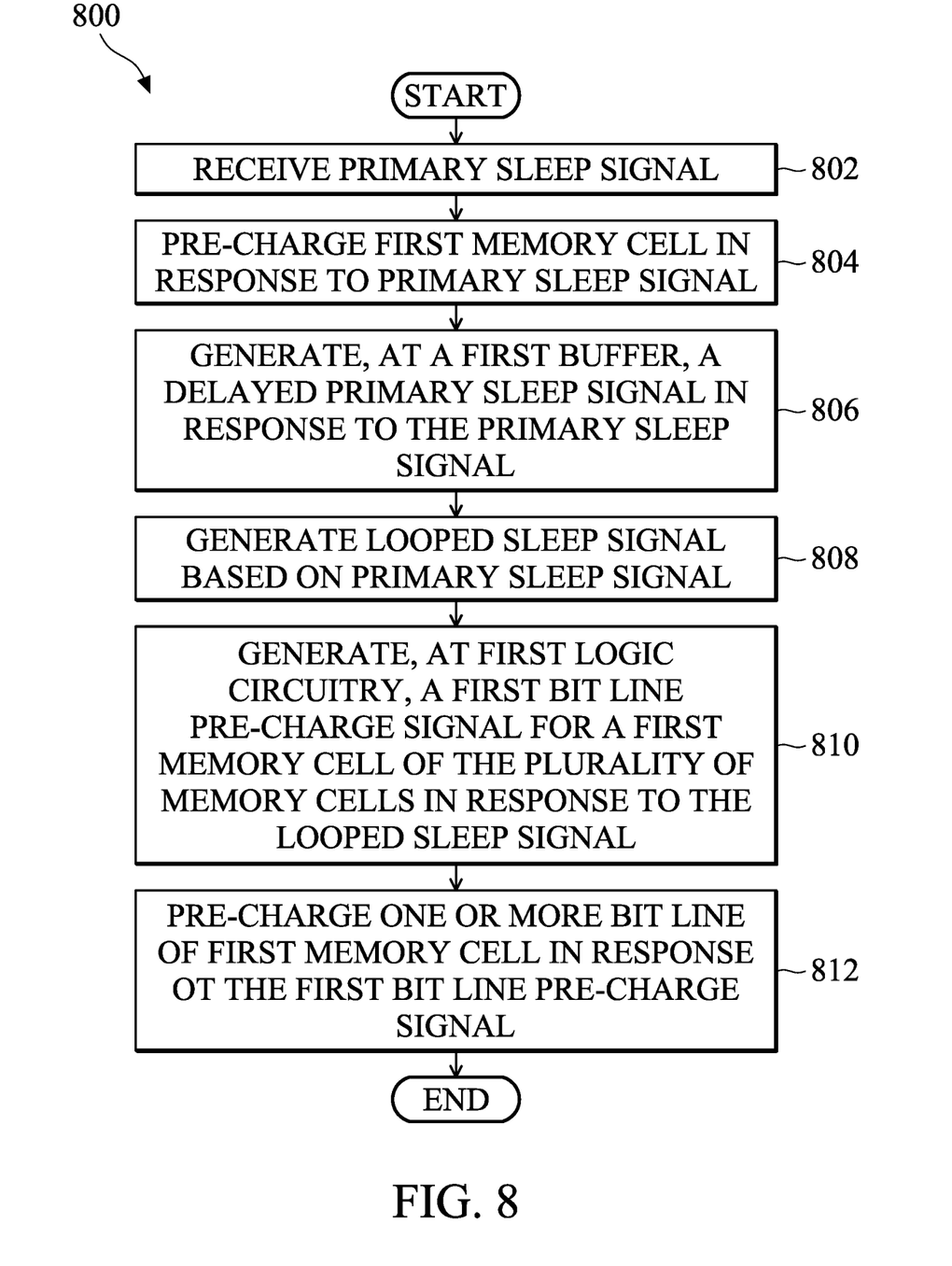
FIG. 8 is a flow diagram of an example method for controlling a wake-up operation for a memory array, in accordance with various embodiments of the present disclosure.

FIG. 8 is a flow diagram of an example method 800 for controlling wake-up operations for a memory array that includes a plurality of memory cells, in accordance with an embodiment. The method 800 may, for example, be performed by the example memory power management circuit 300 shown in FIG. 4. At 802, a primary sleep signal (e.g., SLP_BOT_LEFT in FIG. 4) indicating an initiation of the wake-up operation may be received. The primary sleep signal may be received, for example, by a first memory cell (e.g. memory cell 312 in FIG. 4). At 804, the first memory cell may be pre-charged in response to the primary sleep signal. At 806, a delayed primary sleep signal (e.g., SLP_BOT_RIGHT in FIG. 4) may be generated at a first buffer (e.g., buffer 324 in FIG. 4) in response to the primary sleep signal. At 808, a looped signal (e.g., SLP_1_BOT_LEFT in FIG. 4) may be generated based on the delayed primary sleep signal, such as in response to the delayed primary sleep or a signal derived therefrom. A signal based on the delayed primary sleep signal may include, for example, a second delayed sleep signal (e.g., SLP_TOP_RIGHT in FIG. 4). At 810, a first bit line pre-charge signal (e.g., BPCHB_BOT_LEFT in FIG. 4) for a first memory cell of the plurality of memory cells may be generated at first logic circuitry (e.g., logic circuitry 322 in FIG. 4) in response to the looped sleep signal. Finally, at 812, one or more bit line of the first memory cell may be pre-charged in response to the first bit line pre-charge signal.

Figure 9:
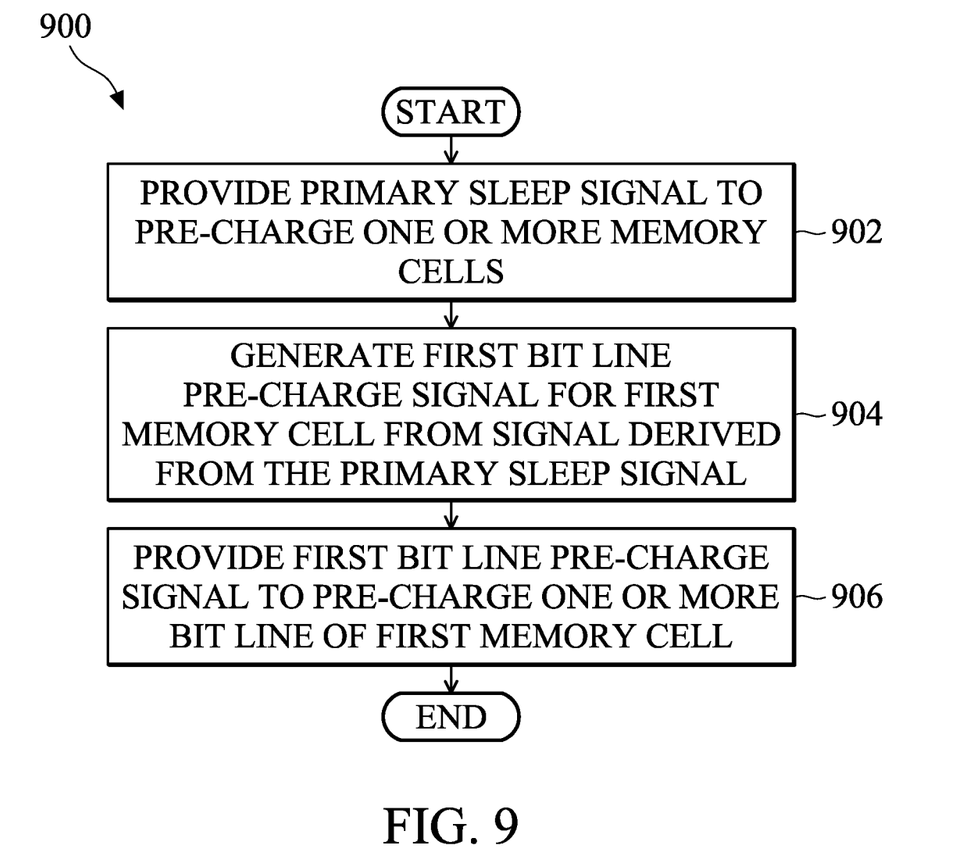
FIG. 9 is a flow diagram of another example method for controlling a wake-up operation for a memory array, in accordance with various embodiments of the present disclosure.

FIG. 9 is a flow diagram of an example method 900 for controlling wake-up operations for a memory array that includes a plurality of memory cells, in accordance with an embodiment. The method 900 may, for example, be performed by the example memory power management circuit 300 shown in FIG. 4. At 902, a primary sleep signal (e.g. SLP_BOT_LEFT in FIG. 4) may be provided to pre-charge one or more memory cells. At 904, a first bit line pre-charge signal (e.g., BPCHB_BOT_LEFT in FIG. 4) for a first memory cell may be generated from a signal (e.g., SLP_1_BOT_LEFT in FIG. 4) derived from the primary sleep signal. At 906, the first bit line pre-charge signal may be provided to pre-charge one or more bit line of the first memory cell. The first bit line pre-charge signal may be delayed from the primary sleep signal to the extent that the one or more bit line is not pre-charged until after the first memory cell has been completely pre-charged. Accordingly, although the method 900 does not necessarily have to include the same components as the method 800 (e.g., first buffer), it may function in a similar manner to delay the bit line pre-charging until after the first memory cell has been substantially pre-charged.

In one example, a memory circuit includes a first memory cell configured to pre-charge in response to receiving a primary sleep signal and a first buffer configured to receive the primary sleep signal and to generate a delayed primary sleep signal. The first logic circuitry may be configured to generate a first bit line pre-charge signal for the first memory cell in response to a looped sleep signal, wherein the looped sleep signal is generated based on the delayed primary sleep signal. The memory circuit may also include a first switching circuitry configured to provide power to one or more bit line of the first memory cell in response to the first bit line pre-charge signal.

In another example, a method for controlling a wake-up operation for a memory array that includes a plurality of memory cells may include the steps of: receiving a primary sleep signal indicating an initiation of the wake-up operation; pre-charging a first memory cell in response to the primary sleep signal; generating, at a first buffer, a delayed primary sleep signal in response to the primary sleep signal; generating a looped sleep signal based on the delayed primary sleep signal; generating, at first logic circuitry, a first bit line pre-charge signal for a first memory cell of the plurality of memory cells, the first bit line pre-charge signal being generated in response to the looped sleep signal; and pre-charging one or more bit line of the first memory cell in response to the first bit line pre-charge signal.

In yet another example, a method for controlling a wake-up operation for a memory array that includes a plurality of memory cells may include: providing a primary sleep signal to pre-charge one or more memory cells; generating a first bit line pre-charge signal for a first memory cell from a signal derived from the primary sleep signal; and providing the first bit line pre-charge signal to pre-charge one or more bit line of the first memory cell, wherein the first bit line pre-charge signal is delayed from the primary sleep signal to the extent that the one or more bit line are not pre-charged until after the first memory cell has been completely pre-charged.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A memory circuit comprising:
   a first memory cell configured to pre-charge in response to receiving a primary sleep signal;
   a first buffer configured to receive the primary sleep signal and to generate a delayed primary sleep signal;
   first logic circuitry configured to generate a first bit line pre-charge signal for the first memory cell in response to a looped sleep signal, wherein the looped sleep signal is generated based on the delayed primary sleep signal and is fed back from one or more memory cells; and first switching circuitry configured to provide power to one or more bit line of the first memory cell in response to the first bit line pre-charge signal.

2. The memory circuit of claim 1, further comprising:
a delay circuit that receives the delayed primary sleep signal and generates the looped sleep signal, wherein the delay circuit is configured to delay the looped sleep signal from being provided to the first logic circuitry until after the first memory cell has been completely pre-charged.

3. The memory circuit of claim 1, further comprising:
a second memory cell configured to pre-charge in response to receiving the delayed primary sleep signal; and
a second buffer configured to receive the delayed primary sleep signal, generate looped sleep signal, and provide the looped sleep signal to the first logic circuitry.

4. The memory circuit of claim 1, further comprising:
a second memory cell configured to pre-charge in response to receiving the delayed primary sleep signal;
a second buffer configured to receive the delayed primary sleep signal, generate a second delayed primary sleep signal, and provide the second delayed primary sleep signal to a third memory cell;
a third memory cell configured to pre-charge in response to receiving the second delayed primary sleep signal;
a third buffer configured to receive the second delayed primary sleep signal, generate the looped sleep signal, and provide the looped sleep signal to the first logic circuitry.

5. The memory circuit of claim 4, wherein the third buffer is configured to provide the looped sleep signal to a fourth memory cell configured to pre-charge in response to receiving the looped sleep signal.

6. The memory circuit of claim 4, wherein the third buffer is configured to delay the looped sleep signal from being provided to the first logic circuitry until after the third memory cell has been completely pre-charged.

7. The memory circuit of claim 1, further comprising:
a first latch circuit that receives the looped sleep signal and the first bit line pre-charge signal and generates a delayed looped sleep signal.

8. The memory circuit of claim 7, wherein the first latch circuit causes a logic state transition in the delayed looped sleep signal to occur after power has been provided to the one or more bit line of the first memory cell.

9. The memory circuit of claim 7, further comprising:
second logic circuitry configured to generate a second bit line pre-charge signal for a second memory cell of the plurality of memory cells, the second logic circuitry being configured to generate the second bit line pre-charge signal in response to the delayed looped sleep signal; and
second switching circuitry configured to provide power to one or more bit line of the second memory cell in response to the second bit line pre-charge signal.

10. The memory circuit of claim 9, further comprising:
a second latch circuit that receives the delayed sleep signal and the second bit line pre-charge signal and generates a second delayed sleep signal;
third logic circuitry configured to generate a third bit line pre-charge signal for a third memory cell of the plurality of memory cells, the third logic circuitry being configured to generate the third bit line pre-charge signal in response to the second delayed sleep signal; and third switching circuitry configured to provide power to one or more bit line of the third memory cell in response to the third bit line pre-charge signal,
wherein the second latch circuit causes a logic state transition in the second delayed sleep signal to occur after power has been provided to the one or more bit line of the second memory cell.

11. The memory circuit of claim 10, further comprising:
a third latch circuit that receives the second delayed sleep signal and the third bit line pre-charge signal and generates a third delayed sleep signal;
fourth logic circuitry configured to generate a fourth bit line pre-charge signal for a fourth memory cell of the plurality of memory cells, the fourth logic circuitry being configured to generate the fourth bit line pre-charge signal in response to the third delayed sleep signal; and
fourth switching circuitry configured to provide power to one or more bit line of the fourth memory cell in response to the fourth bit line pre-charge signal,
wherein the third latch circuit causes a logic state transition in the third delayed sleep signal to occur after power has been provided to the one or more bit line of the third memory cell.

12. A method for controlling a wake-up operation for a memory array that includes a plurality of memory cells, comprising:
receiving a primary sleep signal indicating an initiation of the wake-up operation;
pre-charging a first memory cell in response to the primary sleep signal;
generating, at a first buffer, a delayed primary sleep signal in response to the primary sleep signal;
generating a looped sleep signal based on the delayed primary sleep signal;
generating, at first logic circuitry, a first bit line pre-charge signal for a first memory cell of the plurality of memory cells, the first bit line pre-charge signal being generated in response to the looped sleep signal fed back from one or more memory cells; and
pre-charging one or more bit line of the first memory cell in response to the first bit line pre-charge signal.

13. The method of claim 12, further comprising:
pre-charging a second memory cell in response to the delayed primary sleep signal,
wherein the looped sleep signal is generated at a second buffer in response to receiving the delayed primary sleep signal.

14. The method of claim 12, further comprising:
pre-charging a second memory cell in response to the delayed primary sleep signal;
generating, at a second buffer, a second delayed primary sleep signal in response to the delayed primary sleep signal;
pre-charging a third memory cell in response to the second delayed primary sleep signal;
generating, at a third buffer, the looped sleep signal in response to the second delayed primary sleep signal;
pre-charging a fourth memory cell in response to the looped sleep signal.

15. The method of claim 14, wherein the delayed primary sleep signal, the second delayed primary sleep signal, and the looped sleep signal are generated sequentially.

16. The method of claim 12, further comprising:
generating, at a first latch circuit, a delayed looped sleep signal in response to the looped sleep signal and the first bit line pre-charge signal.

17. The method of claim 16, further comprising:
generating, at second logic circuitry, a second bit line pre-charge signal for the second memory cell of the plurality of memory cells, the second bit line pre-charge signal being generated in response to the delayed looped sleep signal; and
pre-charging one or more bit line of the second memory cell in response to the second bit line pre-charge signal.

18. The method of claim 17, further comprising:
generating, at a second latch circuit, a second delayed looped sleep signal in response to the delayed looped sleep signal and the second bit line pre-charge signal;
generating, at third logic circuitry, a third bit line pre-charge signal for a third memory cell of the plurality of memory cells, the third bit line pre-charge signal being generated in response to the second delayed looped sleep signal;
pre-charging one or more bit line of the third memory cell in response to the third bit line pre-charge signal;
generating, at a third latch circuit, a third delayed looped sleep signal in response to the second looped sleep signal and the third bit line pre-charge signal;
generating, at fourth logic circuitry, a fourth bit line pre-charge signal for a fourth memory cell of the plurality of memory cells in response to the third delayed sleep signal; and
pre-charging one or more bit line of the fourth memory cell in response to the fourth bit line pre-charge signal.

19. The method of claim 18, wherein the delayed looped sleep signal, the second delayed looped sleep signal, and the third delayed looped sleep signal are generated sequentially.

20. A method for controlling a wake-up operation for a memory array that includes a plurality of memory cells, comprising:
providing a primary sleep signal to pre-charge one or more memory cells;
generating a first bit line pre-charge signal for a first memory cell from a signal derived from the primary sleep signal and fed back from one or more memory cells; and
providing the first bit line pre-charge signal to pre-charge one or more bit line of the first memory cell,
wherein the first bit line pre-charge signal is delayed from the primary sleep signal to the extent that the one or more bit line is not pre-charged until after the first memory cell has been completely pre-charged.

* * * * *